United States Patent [19]

Shutt

[11] 4,154,260
[45] May 15, 1979

[54] MASTER CYLINDER HAVING A PROPORTIONING AND METERING VALVE ENCAPSULATED IN SEPARATE OUTLET PORTS

[75] Inventor: Paul B. Shutt, St. Joseph, Mich.

[73] Assignee: The Bendix Corporation, Southfield, Mich.

[21] Appl. No.: 776,343

[22] Filed: Mar. 10, 1977

[51] Int. Cl.² ...................... F16K 31/12; F15B 7/00
[52] U.S. Cl. ............................. 137/505.25; 60/591; 303/6 C
[58] Field of Search ............... 60/534, 535, 545, 562, 60/588, 591, 574, 592; 137/505.25; 188/349; 303/6 C

[56] References Cited

U.S. PATENT DOCUMENTS

| 3,147,042 | 9/1964  | Stelzer    | 303/6 C    |
|-----------|---------|------------|------------|
| 3,637,963 | 1/1972  | Wellman    | 303/6 C    |
| 3,677,606 | 7/1972  | Shutt      | 60/562     |
| 3,686,864 | 8/1972  | Shutt      | 60/535     |
| 3,701,567 | 10/1972 | Shutt      | 137/505.25 |
| 3,734,570 | 5/1973  | Stelzer    | 137/505.25 |
| 3,825,308 | 7/1974  | Kasselmann | 303/6 C    |
| 3,841,711 | 10/1974 | Stelzer    | 303/6 C    |

Primary Examiner—Martin P. Schwadron
Assistant Examiner—Abraham Hershkovitz
Attorney, Agent, or Firm—Leo H. McCormick, Jr.; Ken C. Decker

[57] ABSTRACT

A tube seat assembly for retaining a proportioning valve which is located in an outlet port of a master cylinder. The tube seat assembly has a cylindrical body with an axial bore having first, second and third diameter sections. A radial bore is located in the second diameter section adjacent a shoulder which separates the second and third diameter. A sleeve has a first diameter section concentric to said second diameter section of the axial bore and a second smaller diameter section which extends past the shoulder into the third diameter section of the axial bore. A seal surrounds the second diameter section of the sleeve and separates the second diameter section from the third diameter section of the cylindrical body. A spring connected to the cylindrical body urges the sleeve toward the shoulder in the axial bore. Fluid from a pressurizing chamber in a master cylinder enters the third diameter section of the cylindrical body, passes through the sleeve and out the first diameter section of the cylindrical body for communication to the brake fluid distribution system. When the pressure of the fluid from the pressurizing chamber reaches a predetermined value, the force created by the pressurized fluid acts on the first diameter of the sleeve and overcomes the spring to move the sleeve toward a seat in the third diameter section to interrupt the flow through the sleeve. Thereafter, any increase in the fluid pressure from the pressurizing diameter acts on the second diameter of the sleeve and moves the sleeve toward the shoulder in the cylindrical body to allow a portion of this increase in fluid pressure to be communicated to the blake fluid distribution system. The increase in fluid pressure in the second diameter section acts on the first diameter of the sleeve to again move the sleeve into engagement with the seat and interrupt communication through the sleeve. During movement of the sleeve, the radial bore in the cylindrical body communicates any fluid which flows past the seat to the reservoir to avoid any fluid losses in the brake system.

6 Claims, 1 Drawing Figure

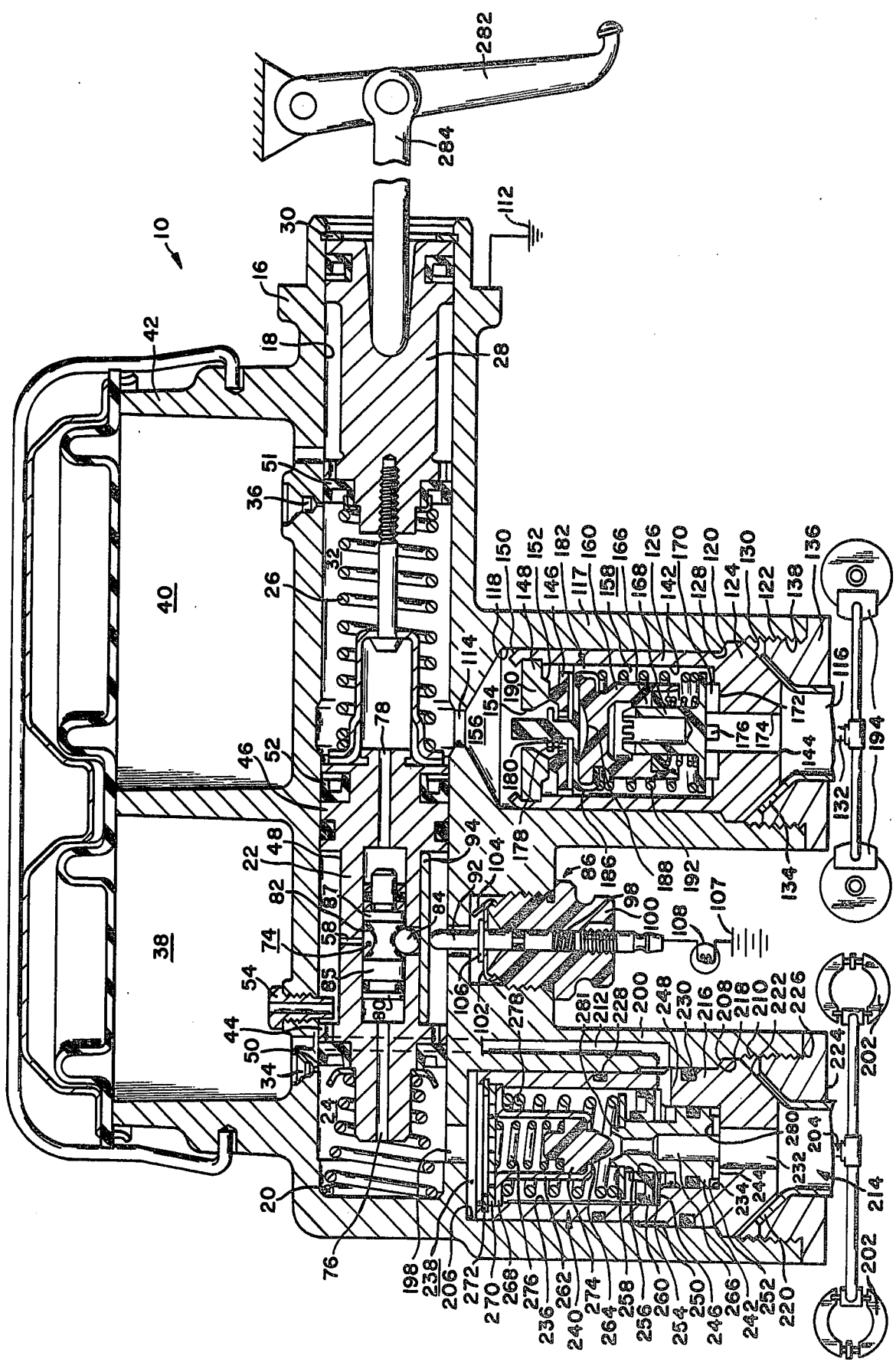

MASTER CYLINDER HAVING A PROPORTIONING AND METERING VALVE ENCAPSULATED IN SEPARATE OUTLET PORTS

BACKGROUND OF THE INVENTION

This invention relates to a proportioning valve apparatus located in the outlet port of a master cylinder for controlling the communication of pressurized brake fluid supplied to the rear wheels of a vehicle.

U.S. Pat. No. 3,686,864 discloses a brake system having a master cylinder with a failure warning switch, a proportioning valve and a metering valve incorporated therein. The output of the master cylinder is connected to front disc brakes through the metering valve and to the rear drum brakes through the proportioning valve to provide substantially uniform braking between the disc and drum brakes. In the event of a brake failure in the front wheel brake system, a shuttle valve moves a first lever to activate the failure warning switch and a second lever which opens a by-pass to allow fluid under pressure to be communicated to the rear wheels without passing through the proportioning valve. This type of lever arrangement, while functioning adequately in engineering laboratory testing has not been completely successfully adapted into production manufacturing techniques since a manual adjustment of the levers is required on each unit constructed to assure proper functioning between the interconnected warning switch and proportioning valve.

SUMMARY OF THE INVENTION

I have devised a new master cylinder incorporating therein independent pre-tested modules to provide a brake system with proportioning, metering and failure warning apparatus. The proportioning and metering modules are located in the separate outlet ports in the master cylinder housing and the failure warning module is connected to the pressurizing chambers in the master cylinder through a passage in the housing. The modules which retain the proportioning and metering valves from a tube seat for the supply conduits which connect the pressurizing chambers in the master cylinder with front wheel disc brakes and the rear wheel drum brakes.

The module retaining the proportioning valve has a cylindrical body with an axial bore having a first diameter section connected to the supply conduit for the rear wheels, a second diameter section connected by a radial passage to the reservoir of the master cylinder and a third diameter section connected to a pressurizing chamber in the master cylinder. A sleeve located in the second diameter section has a first peripheral surface and a smaller second peripheral surface which extends into the third diameter section of the cylindrical body. An axial bore in the sleeve connects the third diameter to the first diameter section. A seal which surrounds the second peripheral surface engages the third diameter section and prevents fluid communication between the third diameter and the second diameter section. A first spring which is retained in the cylindrical body urges the sleeve toward the first diameter section. A second spring urges a poppet against a shoulder on a guide which is aligned with the sleeve.

During a brake application, fluid under pressure is communicated from a pressurizing chamber through the proportioning valve to the supply conduit going to the rear wheel brake by flowing through the third diameter section, the sleeve, and the first diameter section of the cylindrical body. The fluid under pressure as presented to the first diameter acts on the end of the first peripheral surface of the sleeve and when a predetermined pressure level is achieved, overcomes the first spring, and moves the sleeve toward and into engagement with the poppet to interrupt the communication of fluid under pressure through the sleeve. Any further pressurization of the fluid in the chamber in the master cylinder upon communication to the third diameter section, acts on the end of the second peripheral surface to move the sleeve away from the poppet and allows this increase in pressure to be communicated through the sleeve to the first diameter section for distribution by the supply conduit. This increase in pressure acts on the end of the first peripheral surface to again move the sleeve into engagement with the poppet and interrupt communication through the sleeve. Thereafter, with each incremental increase in pressure, the sleeve is shuttled away from the poppet to allow a portion of the pressurized fluid to be communicated to the supply conduit. When the fluid pressure development in the chamber of the master cylinder terminates or decreases, the fluid under pressure acting on the end of the first peripheral surface acts on the poppet to overcome the second spring and allow fluid to flow back into the third diameter section of the cylindrical body. When the reduction in pressure of the fluid in the first diameter section reaches the predetermined level, the first spring moves the sleeve away from the poppet and allows free communication through the sleeve. The radial bore in the cylindrical body allows fluid to be freely communicated from the second diameter section to the reservoir of the master cylinder. Thus, the movement of the sleeve in controlling the fluid distribution to the supply conduit is exclusively controlled by the fluid pressures present in the first and third diameter sections of the cylindrical body. In addition, should a leak occur in the seals which separate the second diameter section from the first and third diameter section, the radial bore and associated passage to the reservoir provides a flow path to avoid loss of fluid often associated with such malfunction.

It is the object of this invention to provide a brake system with a master cylinder having a proportioning valve arrangement incorporated in a first outlet port and a metering valve arrangement incorporated in a second outlet port, the metering and proportioning valve functioning to provide the wheel brakes in the system with substantially uniform brake operation.

It is another object of this invention to provide a proportioning valve with a cylindrical housing which when positioned in an outlet port of a master cylinder forms a tube seat for connecting a pressurizing chamber with a conduit connected to the rear wheel brakes of a vehicle.

It is a further object of this invention to provide a proportioning valve located in an outlet port of a master cylinder with a flow path for communicating any leakage to a reservoir in the master cylinder to prevent the loss of fluid from a brake system should a seal fail in the proportioning valve.

These and other objects should be apparent from reading the specification and viewing the drawing.

BRIEF DESCRIPTION OF THE DRAWING

The drawing shows a sectional view of a master cylinder made pursuant to the teachings of this invention.

DETAILED DESCRIPTION OF THE PREFERRED EMBODIMENT

The master cylinder 10, shown in the drawing, has a housing 16 with a bore 18 located therein. A spring 20 holds a piston 22 away from the bottom of bore 18 to establish a pressurizing chamber 24 in housing 16. A caged spring 26 engages piston 22 and urges a piston 28 against a stop 30 to establish a pressurizing chamber 32.

The housing 16 has compensating ports 34 and 36 through which compartments 38 and 40 of reservoir 42 are connected to chambers 24 and 32, respectively. Piston 22 has a first cylindrical section 44 separated from a second cylindrical section 46 by a groove 48. A first lip seal 50 is located adjacent the first cylindrical section 44 to prevent communication of fluid from chamber 24 into groove 48. A second lip seal 52 is located adjacent the second cylindrical section 46 to prevent communication of fluid from chamber 32 into groove 48. A stop bolt 54 secured to housing 16 engages the first cylindrical section 44 to limit the movement of piston 22 toward chamber 32.

Piston 22 has a chamber 74 located therein with a first passage 76 connected to chamber 24 and a second passage 78 connected to chamber 32. A piston 80 located in chamber 74 prevents fluid communication between chambers 24 and 32. A radial bore 58 connects chamber 74 to groove 48 in order that movement of piston 80 is only dependent upon the fluid pressure communicated from chambers 24 and 32. Piston 80 has a groove 82 located between lands 84 and 86 for retaining ball 84 associated with a failure warning switch 86. The stop bolt 54 which extends into a slot 48 prevents piston 22 from rotating in bore 18. A spring 98 retained in housing 100 urges plunger 92 into contact with lever 94 to hold ball 84 in groove 82.

Plunger 92 has a shoulder 106 thereon which engages grounding clip 102. The ground clip 102 has a leg 104 which is adapted to contact housing 16 whenever plunger 92 is moved by corresponding movement of lever 94. When leg 104 contacts housing 16, an electrical circuit is closed between battery 107, light or indicator 108, terminal 110 and ground 112.

The housing 16 has a passage 114 which connects chamber 32 with an outlet port 116 in boss 117. The boss 117 has an axial bore 118 with a tapered surface 120 adjacent a threaded end section 122.

A tube seat 124 has a cylindrical body 126 which is concentric to the axial bore 118 in boss 117. The cylindrical body 126 has a first tapered surface 128 adjacent surface 120 on the boss 117 and a second tapered surface 130. Conduit 132 which connects the master cylinder to the front wheels 194 has a flared surface 134 on the end thereof which engages the second tapered surface 130. A fastener or tube nut 136 which surrounds the supply conduit 132 has threads 138 thereon which engage threaded section 122 on the outlet port 116. When face 140 on the tube nut 136 engages the end of boss 117, tapered surfaces 120 and 128 and tapered surface 130 and flared surface 134 are sealed to prevent fluid communication between the outlet port 116 and the surrounding environment.

The cylindrical body 126 has axial bore 142 located therein for connecting passage 114 from chamber 32 with passage 144 in the tube seat 124. A disc 148 which is retained in bore 142 by tabs 150 has a passage 154 for connecting inlet chamber 156 to bore 142. A first valve 146 which is located adjacent seat 152 separates inlet chamber 156 from the outlet chamber 158. An annular valve support 160 has an open-ended bore 166 which is slidably supported in bore 142 by a guide 168. The guide 168 which is positioned in groove 172 has a base 170 with an axial bore 174 and a plurality of radial bores 176 through which fluid is communicated from outlet chamber 158 into passage 144.

The first valve 146 has a series of passages 178 adjacent a central opening 180. A second valve 182 has a stem 184 which extends through the central opening 180. The stem 184 is attached to a diaphragm 186 secured to valve support 160. The valve support 160 has a cavity 188 on the end thereof to allow stem 184 to move toward the support and bring annular face 190 into contact with the first valve 146 to interrupt communication between the inlet and outlet chambers 156 and 158 through passages 178. A spring 192 located between the base 170 of guide 168 and support 160 urges the first valve 146 toward the annular seat 152 to interrupt fluid from being communicated from inlet chamber 156 into the outlet chamber 158 and prevent the actuation of the front wheel brakes 194 until such time that pressurized fluid from chamber 32 is sufficient to overcome spring 192.

Housing 16 has a passage 198 which connects chamber 24 with a boss 200. Boss 200 is connected to the rear wheel brakes 202 through a conduit 204. Boss 200 has a stepped bore 206 with a tapered section 208 located adjacent a threaded section 210. A passage 212 connects the stepped bore 206 with chamber 38 in the reservoir 42.

A tube seat member 214 has a cylindrical body 216 with a peripheral surface which matches the stepped bore 206. A firs taper 218 engages tapered surface 208 on the housing 16 and a second tapered surface 222 engages flared end 220 on conduit 204. A fastener or tube nut 224 has threads thereon which are mated with the threads 210 on boss 200. When face 225 on tube nut 224 engages boss 200, the tapered surfaces 208 and 218 and tapered surface 222 and flared end 220 are sealed to prevent fluid communication to the atmosphere. In addition seals 228 and 230 prevent fluid communication along the stepped bore 206 into passage 212.

The cylindrical body 216 has a first diameter section 232, a second diameter section 234, and a third diameter section 236 which connects an input 238 chamber with the supply conduit 204. The first diameter section 232 is separated from the second diameter section 234 by a first shoulder 244 while a second shoulder 246 separates the second diameter section 234 from the third diameter section 236. A radial bore 248 adjacent the second shoulder 246 connects the second diameter section 234 with groove 250 associated with passage 212. A proportioning valve 240 is located in second and third diameters 234 and 236 to control the fluid under pressure which is communicated from the inlet chamber 238 to the first diameter section 232. The proportioning valve 240 has a sleeve 242 with a first peripheral surface 252 located in the second diameter section 234 and a smaller second peripheral surface 254 which extends into the third diameter section 236.

The second peripheral surface 254 has a shoulder 256 for locating a retainer 258. A seal 260 is located adjacent the second shoulder 246 to prevent fluid communication from the third diameter section 236 into the second diameter section 234.

A guide 262 has a central opening 264 aligned with passage 266 in the sleeve 242 and an annular flange 268.

A perforated disc 270 is located between the annular flange 268 and a snap ring 272. A poppet member 274, located in guide 262, is urged against the housing surrounding central opening 264 by a first spring 276. A second spring 278 located between the annular flange 268 and the retainer 258 urges face 280 toward shoulder 244 to allow free communication of fluid to conduit 204 by way of the third diameter section 236, the first diameter section 32 and passage 266 in the sleeve 242.

MODE OF OPERATION OF THE INVENTION

When an operator applies an input force to pedal 282, push rod 284 moves piston 28 away from top 30 by overcoming return spring 20. When piston 28 moves, lip seal 51 moves past compensator port 36 to seal chamber 32 from chamber 40 while spring 26 moves the second piston 22 to move lip seal 50 past compensator port 34 to seal chamber 24 from chamber 38 in reservoir 42.

Further movement of pistons 28 and 22 by push rod 284 pressurizes fluid in chambers 24 and 32. The fluid under pressure is communicated from chamber 32 through outlet port 114 into chamber 156. The fluid flows through passages 154 and 178 into outlet chamber 158. This fluid pressure acts on and moves the diaphragm 186 into cavity 188 to bring face 190 into sealing engagement with valve 146 to interrupt fluid communication through passage 178 into the outlet chamber 158.

During this same period, fluid under pressure from chamber 24 is communicated to supply conduit 204 by way of passage 198, third diameter section 236 of cylindrical body 216, passage 266 in sleeve 242, and the first diameter section 232 in the cylindrical body 216, to bring the wheel brakes 202 into engagement with the brake drums.

Thereafter with a predetermined fluid pressure development in chambers 32 and 24, the fluid pressure when transmitted from chamber 32 acts on the first valve 146 to overcome spring 190 and allows fluid under pressure to activate disc brakes 132. This same fluid under pressure when transmitted from chamber 24 acts on face 280 to overcome spring 278 and move face 281 into engagement with poppet 274 to interrupt fluid communication to the drum brakes 202.

Thereafter, the fluid pressure developed in chambers 24 and 32 is distributed to the disc brakes 194 and drum brakes 202 such that uniform braking is created through the operation of the metering valve 182 and the proportioning valve 240.

I claim:
1. A proportioning valve apparatus for use in an outlet boss of a housing of a master cylinder comprising:
   a tubular housing located in said outlet boss and having a stepped bore with a first diameter section, a second diameter section and a third diameter section, said first diameter section being connected to a wheel brake and said third diameter receiving fluid from a pressurizing chamber in the master cylinder, said tubular housing having a radial bore for connecting the second diameter section to a passageway located in said housing of the master cylinder and connected to a reservoir, said tubular housing having first and second annular grooves located on the outer peripheral surface thereof on opposite sides of said radial bore;
   first and second seals located in said first and second grooves to prevent fluid communication along the stepped bore into said passageway, and said radial bore;
   a sleeve having a first peripheral surface which engages said second diameter section and a smaller second peripheral surface which extends into said third diameter section of the tubular housing, said sleeve having a first pressure surface adjacent the end of said first peripheral surface and a second pressure surface adjacent the end of said second peripheral surface, said first pressure surface having a larger effective area than said second pressure surface;
   seal means surrounding said second peripheral surface of said sleeve to prevent fluid communication from said third diameter section of said stepped bore to said passageway through said radial bore while allowing unrestricted fluid communication between said second diameter section and said passageway to establish a flow path to the reservoir for any fluid that may flow past said seal means in order to retain said any fluid within the master cylinder;
   a retainer connected to said smaller second peripheral surface of said sleeve;
   resilient means located in said third diameter section of said stepped bore for engaging said retainer and urging said sleeve toward said first diameter section of said stepped bore; and
   poppet mean located in said third diameter section for engaging said sleeve whenever a differential force generated by the fluid under pressure communicated to said third diameter of the bore from the pessurizing chamber acts on the first and second pressure surfaces of the sleeve in a manner to overcome the biasing force of the resilient means and move said sleeve toward said poppet means to interrupt the fluid communication between said third diameter section and said first diameter section, said sleeve responding to further increases in the pressure of the fluid in the pressurizing chamber by moving away from said poppet to allow the fluid pressure to the wheel brake to increase as a function of the ratio of the first pressure surface to the second pressure surface.

2. The proportioning valve apparatus, as recited in claim 1 wherein said tubular housing includes:
   a flange radially extending inward from said third diameter section for caging said resilient means in said third diameter section.

3. The proportioning valve apparatus, as recited in claim 2, further including:
   a guide having an outward radial projection located between said resilient means and said flange and an inward radial projection for retaining said poppet means in axial alignment with said sleeve.

4. The proportioning valve apparatus, as recited in claim 3, further including:
   a disc located between said outward raidal projection on said guide and said flange; and
   a spring connected to said disc for urging said poppet toward said inward radial projection.

5. The proportioning valve apparatus as recited in claim 1 wherein said first diameter of said tubular housing includes:
   a first tapered section for engaging the outlet boss; and a second tapered section for engaging the end of a conduit through which fluid is communicated to the wheel brake.

6. The proportioning valve apparatus, as recited in claim 5 further including;

a fastener attached to said outlet boss and engaging said end of the conduit to hold said first tapered section against the outlet boss and said end of the conduit against the second tapered section to establish a fluid tight connection between the conduit and the outlet boss.

* * * * *